United States Patent

Tomida

[11] Patent Number: 5,809,839
[45] Date of Patent: Sep. 22, 1998

[54] SHIFT LEVER DEVICE

[75] Inventor: Shigetoshi Tomida, Aichi-ken, Japan

[73] Assignee: Kabushiki Kaisha Tokai-Rika-Denki-Seisakusho, Aichi-ken, Japan

[21] Appl. No.: 773,490

[22] Filed: Dec. 23, 1996

[30] Foreign Application Priority Data

Dec. 28, 1995 [JP] Japan .................................. 7-342510

[51] Int. Cl.[6] .................................................. F16H 59/02
[52] U.S. Cl. ........................ 74/473.3; 74/473.23; 74/538
[58] Field of Search .................................. 74/473 R, 475, 74/538, 473.3, 473.23

[56] References Cited

U.S. PATENT DOCUMENTS

| 5,497,673 | 3/1996 | Kataumi et al. | 74/538 X |
| 5,651,293 | 7/1997 | Ebenstein | 74/538 X |
| 5,666,855 | 9/1997 | Ebenstein et al. | 74/538 X |

FOREIGN PATENT DOCUMENTS

6-49145   7/1994   Japan .
6-50941   7/1994   Japan .

*Primary Examiner*—Allan D. Herrmann
*Attorney, Agent, or Firm*—Sixbey Friedman Leedom & Ferguson; Thomas W. Cole

[57] ABSTRACT

There is provided a shift lever device of which structure is simplified and assembling and manufacturing operation is facilitated and which can be manufactured at a low cost. A pivot-supporting retainer portion is provided at a base end portion of a shift lever and a detent pin is mounted at an intermediate portion of the shift lever. A retainer-portion insertion hole and a lever-shaft-portion through hole are formed in a base member and in a box-shaped pivot-supporting housing portion. The retainer portion is inserted into and supported at a bottom portion of the pivot-supporting housing portion. Further, a detent pin is provided to face a detent opening of a detent portion formed to project from peripheral edges of the retainer-portion insertion hole and the lever-shaft-portion through hole, and in this state, the shift lever provided with the retainer portion and the detent pin can be mounted in the base member.

20 Claims, 5 Drawing Sheets

SHIFT LEVER DEVICE

BACKGROUND OF THE INVENTION

1. Field of the Invention

The present invention relates to a shift lever device of a transmission for a vehicle, which is constructed such that assembling and manufacturing thereof are facilitated.

2. Description of the Related Art

Generally, in an automatic transmission of a vehicle, a shift lever device is used to select a shift position.

As a shift lever mounted on such a shift lever device as the above, for example, there has been proposed a shift lever in which a retainer portion extending in a direction perpendicular to an axial line of a bar-shaped lever shaft portion is mounted at a base portion of the lever shaft portion so that the shift lever has, as a whole, an inverted T-shaped configuration. The retainer portion is formed in a tubular shape having an axial hole. In a state in which the axial hole of the retainer portion is made coincident with a shaft fixing hole of a bracket provided in a lower portion of a base member by which the shift lever is supported on a vehicle body, a supporting shaft is inserted into and fixed to these holes so that the retainer portion is supported pivotally. As a result, the shift lever is pivotally supported by the base member.

A through hole of which longitudinal direction coincides with the longitudinal direction of a vehicle body is formed in the central portion of the base member, and the shift lever moves within the through hole in the longitudinal direction of the vehicle body synchronously with a shift operation. However, since the transverse dimension of the through hole is small, a support portion cannot be mounted in such a manner as to pass through the through hole from a vehicle-upper side of the base member to a vehicle-lower side of the base member during assembling of the shift lever device. For this reason, conventionally, there has been required a complicated assembling operation in which the shift lever is divided and is inserted from the vehicle-lower side of the base member, or the like.

Further, in order to prevent penetration of water or the like into the support portion, a bag-shaped boots member must be mounted at the lower portion of the base member in such a manner as to include the supporting bracket.

As described above, in the conventional shift lever device, the assembling operation is complicated and the operating efficiency is poor. Further, since the through hole is formed in the base member, it is necessary to provide a complicated structure in which a portion of the base member in the vicinity of a shift-lever pivot supporting portion is reinforced to have a sufficient strength, thereby resulting in an increase in the number of parts and operating processes. Accordingly, there exist drawbacks in that manufacturing cost of the device increases and the product price also becomes expensive.

SUMMARY OF THE INVENTION

In view of the above-described circumstances, it is an object of the present invention to provide a shift lever device of which structure is simplified and assembling and manufacturing operation is facilitated, and which can be manufactured at a low cost.

In accordance with the present invention, there is provided a shift lever device which comprises: a base member in which a shift lever is mounted, the shift lever being provided with a pivot-supporting retainer portion disposed at a base portion of a lever shaft portion and a detent pin projecting from an intermediate portion of the lever shaft portion and operated to be movable in an axial direction of the lever shaft portion, the base member including a retainer-portion insertion hole having an opening area which is greater than or equal to an area which allows the retainer portion of the shift lever to pass through; a lever-shaft-potion through hole which communicates with the retainer-portion insertion hole of the base member and which is formed to have an opening area which allows a predetermined shift operation of the lever shaft portion; a pivot-supporting housing portion projecting from one surface portion of the base member in the shape of a box with the retainer-portion insertion hole and the lever-shaft-portion through hole being formed, the pivot-supporting housing portion being provided to allow mounting of the shift lever in a swingable manner at a predetermined angle by the retainer portion being pivotally supported at a bottom portion of the pivot-supporting housing portion; a detent portion provided upright in the shape of a wall along side portions of the retainer-portion insertion hole and the lever-shaft-portion through hole on a surface portion of the base member which is opposite to the surface portion where the pivot-supporting housing portion is formed; and a detent opening formed in the detent portion at a position corresponding to a moving range of the detent pin.

Since the present invention is constructed in the above-described manner, the shift lever in which the retainer portion is provided at the base portion of the lever shaft portion and the detent pin is mounted at the intermediate portion of the shift lever is inserted from a side of the retainer portion into the pivot-supporting housing portion through the retainer-portion insertion hole of the base member, and the retainer portion is pivotally supported at the bottom portion of the pivot-supporting housing portion. This simple structure makes it possible to mount the shift lever in the base member in a swingable manner at a predetermined angle and to mount the detent pin in such a manner that the detent pin faces the detent opening.

As described above, since the shift lever device according to the present invention has a simplified structure, it has an excellent effect in that the assembling and manufacturing operation is facilitated and the shift lever device can be manufactured at a low cost.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENT

Figure 1:
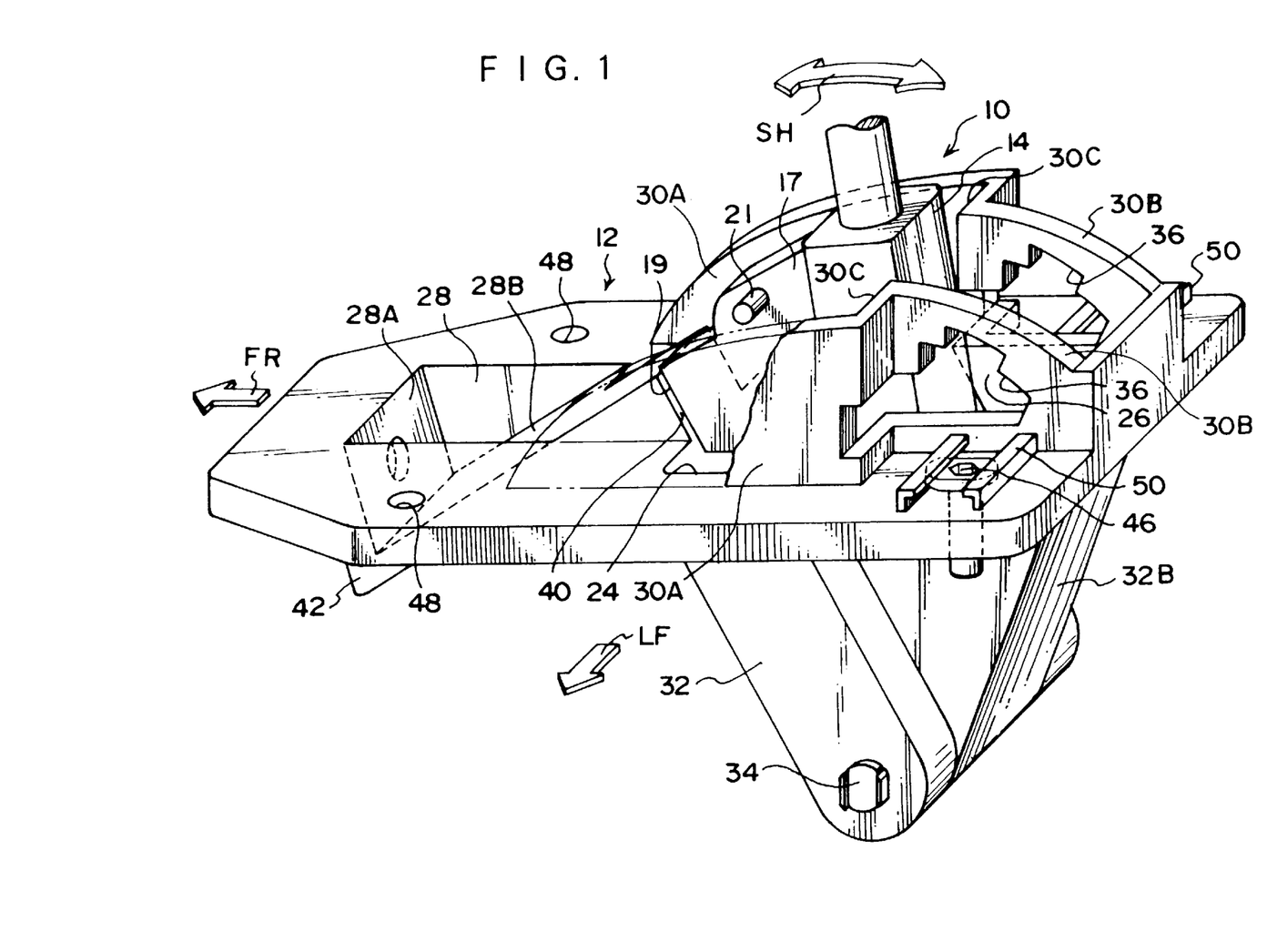
FIG. 1 is a perspective view showing, partly in cross section, a principal portion of a shift lever device according to an embodiment of the present invention in a state in which a shift lever is located at a parking position.
Figure 2:
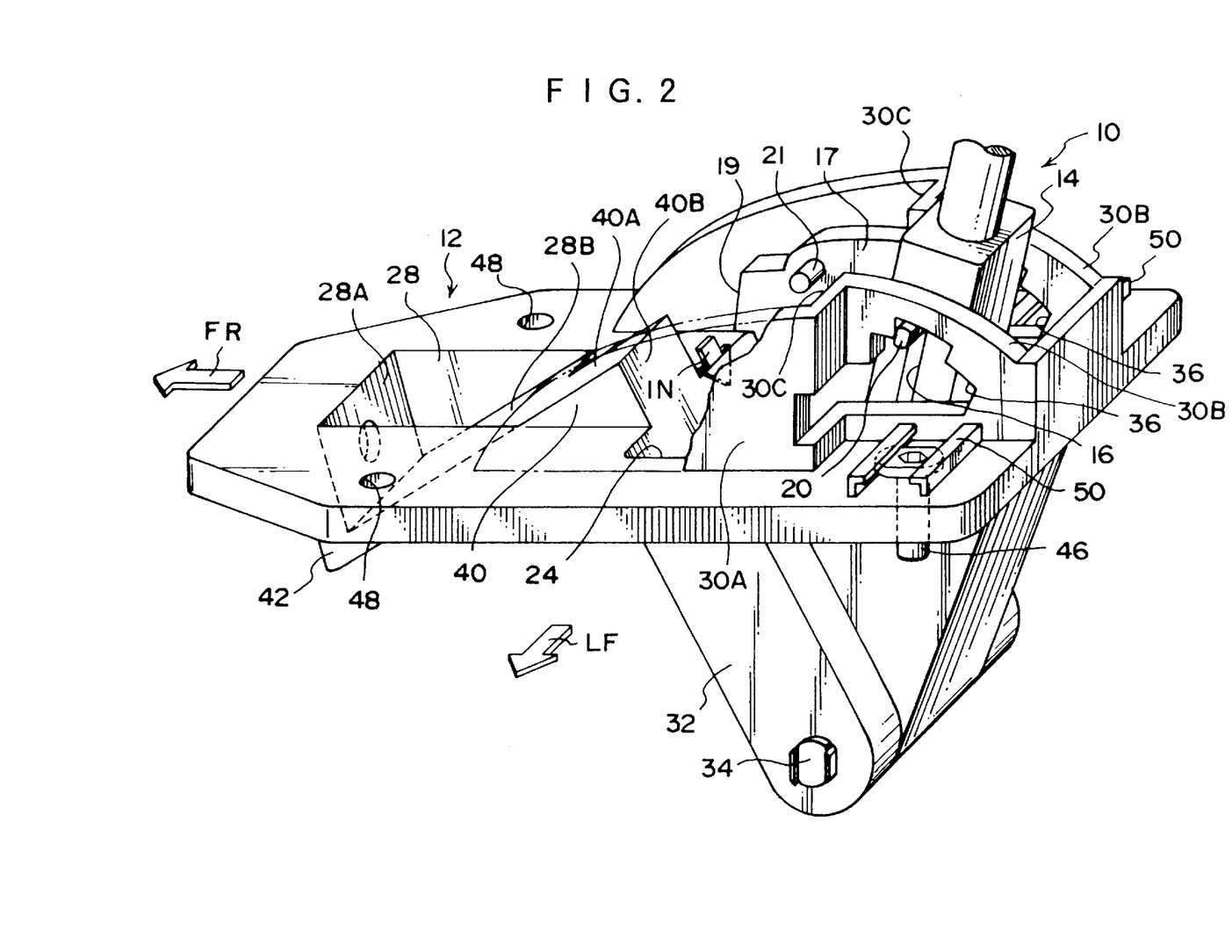
FIG. 2 is a perspective view showing, partly in cross section, a principal portion of the shift lever device according to the embodiment of the present invention in a state in which the shift lever is located at other position than the parking position (the wall portion at the front side of the surface of the paper on which FIG. 2 is illustrated is shown partly in cross section)
Figure 3:
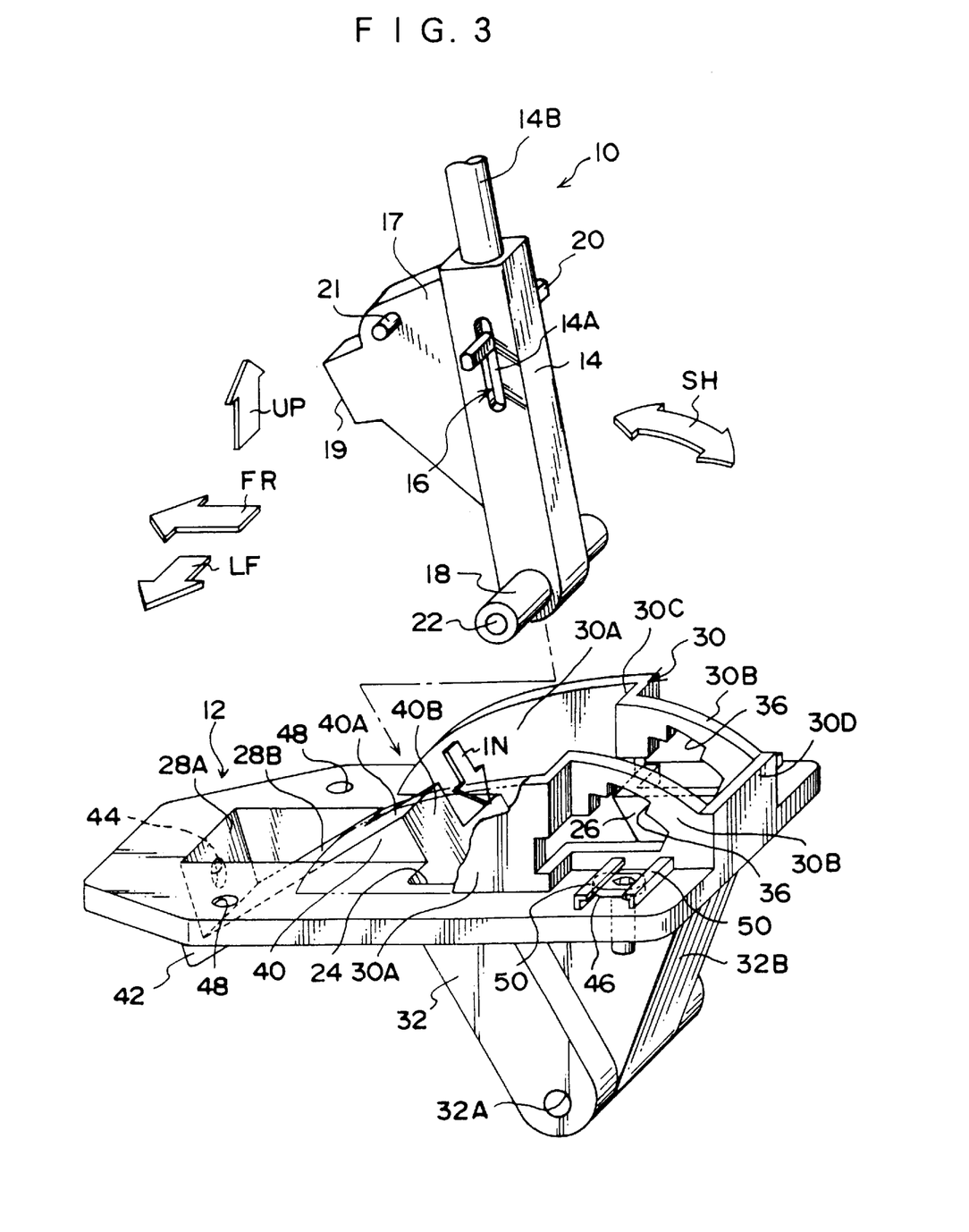
FIG. 3 is an exploded perspective view showing a principal portion of the shift lever device according to the embodiment of the present invention.

A shift lever device according to an embodiment of the present invention includes a shift lever 10 whose base end portion is shown in FIG. 3 and a base member 12 shown in FIGS. 1 through 4, by which assembling of the shift lever 10 is facilitated. Note that arrows "FR", "UP", and "LF" shown in the accompanying drawings, respectively represent: the forward direction of a vehicle in a state in which the shift lever device is mounted on a vehicle body; the upward direction of the vehicle; and the leftward direction of the vehicle.

A detent pin portion 16 is mounted in the shift lever 10 at an intermediate portion of a hollow lever shaft portion 14 and a retainer portion 18 is provided at a lower end portion of the shift lever 10.

In the detent pin portion 16, a detent pin 20 formed in the shape of a thin rod and passing through the lever shaft portion 14 in a direction perpendicular to the lever shaft portion 14 is provided to be movable along an axial direction of the lever shaft portion 14 in an oblong hole 14A formed in the lever shaft portion 14. The detent pin 20 is urged by its elastic force toward an upper end of the oblong hole 14A and is provided to be moved vertically in the oblong hole 14A due to an operation of an operating button of an unillustrated shift knob provided at an upper end portion of the lever shaft portion 14.

A trapezoidal projecting portion 17 is formed integrally with the lever shaft portion 14 in the vicinity of the detent pin portion 16 in such a manner as to project from the lever shaft portion 14 toward the left side of the paper of FIG. 3 (i.e., in the forward direction of the vehicle). An abutting side surface portion 19 is formed at an end portion of the projecting portion 17. A wire-wound pin 21 is formed in an upper portion of the projecting portion 17 so as to project from a side surface of the projecting portion 17 in the transverse direction of the vehicle.

Further, the retainer portion 18 is formed integrally with a lower end portion of the lever shaft portion 14 shown in FIG. 3. The retainer portion 18 is formed in the shape of a tube of a predetermined length, with a bearing hole 22 being formed therein.

The retainer portion 18 is provided such that an axial line of the bearing hole 22 extends in a direction perpendicular to the axial line of the lever shaft portion 14, i.e., in the transverse direction of the vehicle. Namely, the retainer portion 18 is formed integrally with the lower end portion of the lever shaft portion 14 so that the shift lever 10 has an inverted T-shaped configuration.

The shift lever 10 having the inverted T-shaped configuration in the above-described manner is, as shown in FIGS. 1 and 2, mounted in the base member 12 in such a manner as to be swingable at a predetermined angle (in directions indicated by the double-headed arrow SH). Meanwhile, an upper portion of the lever shaft portion 14 is formed as a cylindrical shaft portion 14B and an unillustrated operating knob is mounted at an upper end portion of the cylindrical shaft portion 14B.

Figure 4:
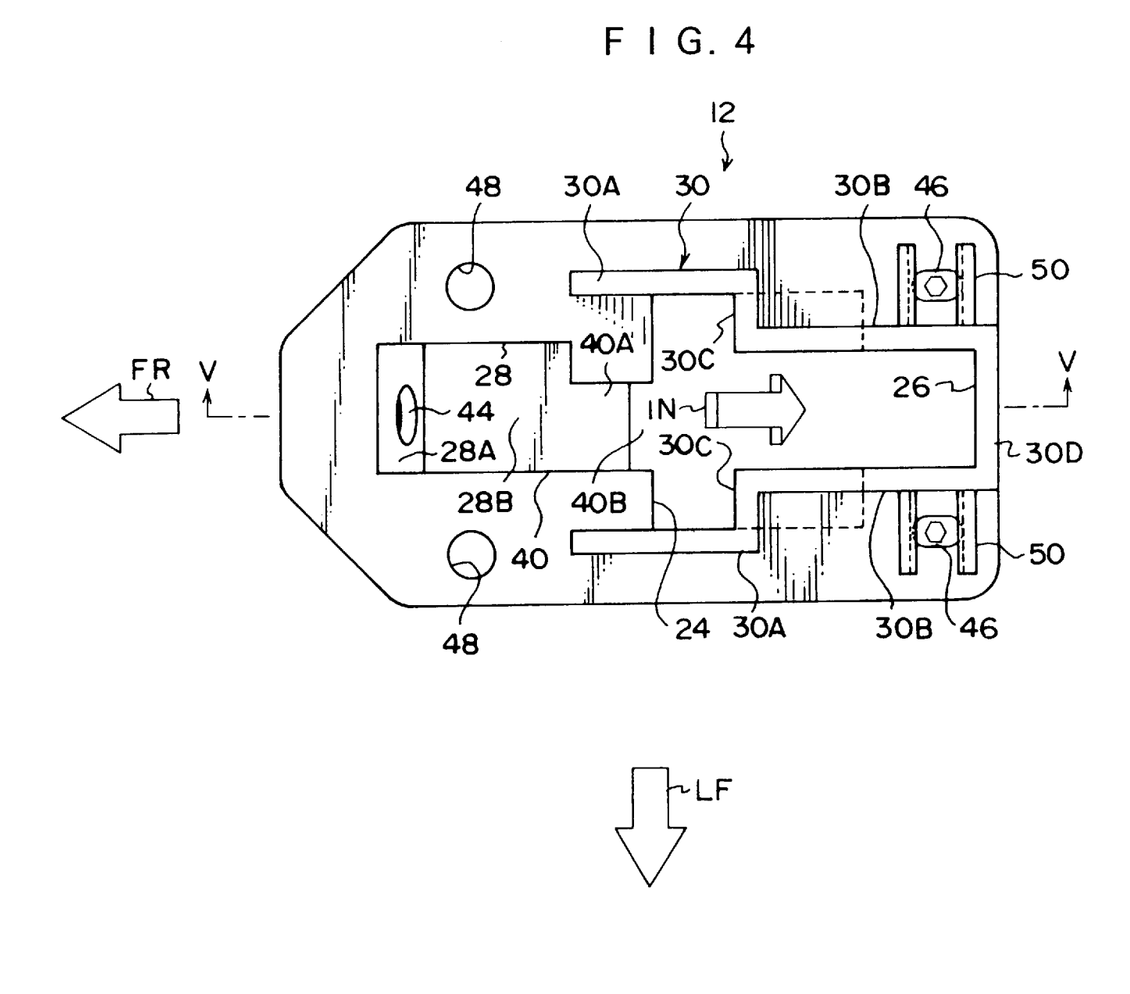
FIG. 4 is a plan view showing a base member of the shift lever device according to the embodiment of the present invention.
Figure 5:
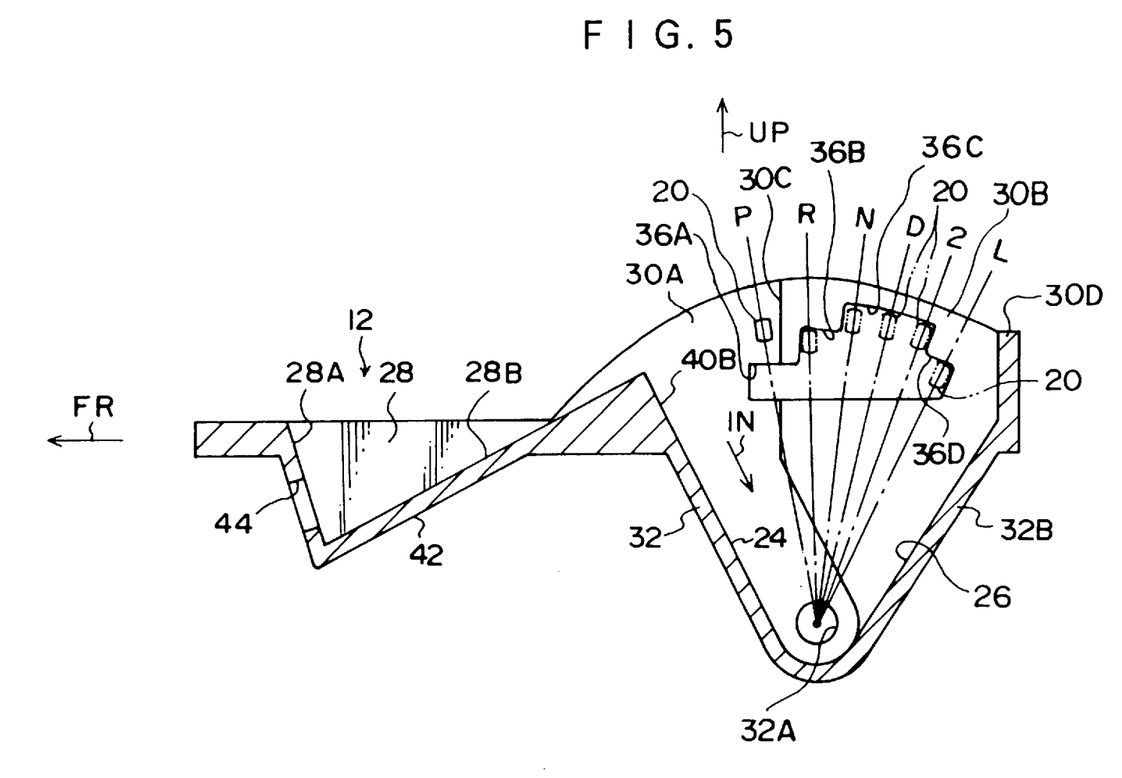
FIG. 5 is a longitudinal cross-sectional view of the shift lever device according to the embodiment of the present invention taken along the lines 5—5 of FIG. 4.

The base member 12 is, as shown in FIGS. 4 and 5, formed in the shape of a thick-walled flat plate whose longitudinal direction coincides with the longitudinal direction of the vehicle. A retainer-portion insertion hole 24 whose longitudinal direction coincides with the transverse direction of the vehicle is formed to pass through the central portion of the base member 12. Further, a lever-shaft-portion through hole 26 extends from an intermediate portion of the retainer-portion insertion hole 24 in the transverse direction of the vehicle to the rear side of the vehicle and the longitudinal direction of the lever-shaft-portion through hole 26 coincides with the longitudinal direction of the vehicle. The lever-shaft-portion through hole 26 also passes through the base member 12 in the vertical direction of the vehicle.

A transmission connecting wire through portion 28 whose longitudinal direction coincides with the longitudinal direction of the vehicle is provided in the base member 12 at a position further at the front side of the vehicle than the retainer-portion insertion hole 24. The wire through portion 28 passes through the base member 12 in the vertical direction of the vehicle and communicates with an interior of a V-shaped box portion 42 fixed integrally to a lower surface of the base member 12. As a result, the transmission connecting wire through portion 28 is covered by the V-shaped box portion 42 and is divided from a lower portion of the base member 12. The transmission connecting wire through portion 28 is formed in the shape of a V-shaped groove in cross section along the longitudinal direction of the vehicle. A vehicle-front side portion of the V-shaped groove is formed as a steep slope surface 28A, and a vehicle-rear side portion thereof is formed as an gentle slope surface 28B. Further, a wire through hole 44 is formed on the steep slope surface 28A in such a manner as to pass through the V-shaped box portion 42.

A bottom surface of a triangular block-shaped projecting portion 40 is fixed integrally to the base member 12 between the transmission connecting wire through portion 28 and the retainer-portion insertion hole 24. A slope surface 40A of the block-shaped projecting portion 40 at the front side of the vehicle is placed on the same level as the gentle slope surface 28B. Further, a slope surface 40B of the projecting portion 40 at the rear side of the vehicle is placed on the same level as the inner peripheral surface of the retainer-portion insertion hole 24 and abuts against the abutting side surface portion 19 of the shaft lever portion 14 to restrict an amount by which the lever shaft portion 14 swings in the forward direction of the vehicle.

A detent portion 30 is formed integrally with an upper flat surface portion of the base member 12 in such a manner as to project upward to form a wall portion at a peripheral edge, in the transverse direction of the vehicle, of the retainer-portion insertion hole 24 and the lever-shaft-portion through hole 26. The detent portion 30 is, as shown in FIG. 4, constructed in that wall portions 30A provided upright on side edges of the retainer-portion insertion hole 24 in the transverse direction of the vehicle and wall portions 30B provided upright on side edges of the lever-shaft-portion through hole 26 in the transverse direction of the vehicle are connected by wall portions 30C provided upright on edges of the retainer-portion insertion hole 24 at the rear side of the vehicle, and respective end portions of the wall portions 30B at the rear side of the vehicle are connected by a wall portion 30D which is provided upright on the vehicle-rear-side edge of the lever-shaft-portion through hole 26. As illustrated in FIG. 3, respective dimensions in height of the wall portion 30A and the wall portion 30B at the sides where these wall portions are connected to the wall portions 30C are made greatest and the wall portions 30A, 30B are formed so that their dimensions in height are gradually made smaller in the forward and rearward directions of the vehicle, respectively. Further, the wall portions 30A extend in the forward direction of the vehicle as shown in FIG. 4 to the sides of the block-shaped projecting portion 40.

Further, an upper end of a hollow pivot-supporting housing portion 32 is integrally fixed to a lower surface portion of the base member 12 as shown in FIGS. 1 through 3. The pivot-supporting housing portion 32 is fixed, in an inclined state, to the base member 12 with its lower end portion being obliquely directed toward the rear and lower side of the vehicle when seen from the transverse direction of the vehicle. The pivot-supporting housing portion 32 has a rectangular frame-shaped configuration in horizontal cross section and a hollow inner portion thereof communicates with the retainer-portion insertion hole 24 so that the retainer-portion insertion hole 24 extends in an obliquely rearward and downward direction of the vehicle (i.e., the direction indicated by arrow IN) when seen from the transverse direction of the vehicle. The retainer-portion insertion hole 24 thus formed deeply is constructed such that a lower portion thereof is defined from the lower portion of the base member 12 by the pivot-supporting housing portion 32 and allows the retainer portion 18 together with the lower portion of the lever shaft portion 14 to be inserted to the vicinity of the lower end portion of the pivot-supporting housing portion 32. A through hole 32A is formed on side surfaces of the pivot-supporting housing portion 32 facing in the transverse direction of the vehicle so as to pass through the pivot-supporting housing portion 32 with an axial center of the through hole 32A facing in the transverse direction of the vehicle. A shaft pin 34 passes through the through hole 32A so as to pivotally support the retainer portion 18. A space between the shaft pin 34 and the through hole 32A is sealed by a sealing material or the like so that water or the like does not penetrate into the inner portion of the pivot-supporting housing portion 32 from a vehicle-lower side of the pivot-supporting housing portion 32. A hollow box-shaped shaft passing housing portion 32B is fixed integrally to a vehicle-rear side portion of the pivot-supporting housing portion 32 and an interior of the shaft passing housing portion 32B communicates with the retainer-portion inserting hole 24 and the lever-shaft-portion through hole 26. The shaft passing housing portion 32B has an inverted triangular shape of which the transverse-direction dimension gradually decreases from the upper side to the lower side when seen from the transverse direction of the vehicle. As a result, the lever-shaft-portion through hole 26 is formed deeply to the vicinities of the lower end portion of the retainer-portion insertion hole 24. For this reason, when the shift lever is shifted to a position at the rear side of the vehicle, the lever shaft portion 14 is inserted from the retainer-portion insertion hole 24 into the lever-shaft-portion through hole 26. The retainer-portion insertion hole 24 and the lever-shaft-portion through hole 26 form a fan-shaped configuration, when seen from the transverse direction of the vehicle, with the through hole 32A serving as a pivotal point. As a result, the length of the lever-shaft-portion through hole 26 along the transverse direction of the vehicle is set so as to accommodate the lever shaft portion 14.

Detent openings 36 having the same shape are formed in the wall portions 30A, the wall portions 30B, and the wall portions 30C at the vehicle-left and right sides of the detent portion 30, respectively, in such a manner as to pass through the detent portion 30 in the transverse direction of the vehicle. The detent opening 36 (36A, 36B, 36C, 36D) has a concave and convex shape for restricting the movement of the detent pin 20 inserted therein.

Namely, as shown in FIG. 5, the detent opening 36 has a structure in that stepped portions are formed at an upper side of the opening whose bottom side is made linear. A through opening portion 36A in which a distance between the opening upper and lower sides is made small to cause the detent pin 20 to pass through is formed in a left-side end portion of the detent opening 36 on the paper of FIG. 5. The opening upper side of the through opening portion 36A is formed linearly. Further, when the shift lever is located at the parking position, the detent pin 20 is located at a position above the through opening portion 36A in such a manner that its swinging operation is restricted by the wall portion 30C.

A reverse-position range 36B is formed continuously from the through opening portion 36A at the right side of the through opening portion 36A on the paper of FIG. 5 in such a manner that an interval between the opening upper and lower sides in the reverse-position range 36B is made greater than that of the through opening portion 36A by an amount of one step. The opening upper side of the reverse-position range 36B is formed in the shape of a circular arc with the through hole 32A serving as a pivot point. When the detent pin 20 is located at the reverse-position range 36B, the detent pin 20 abuts against a wall between the reverse-position range 36B and the through opening portion 36A so that movement thereof from the reverse position to the parking position is prevented.

A neutral/drive/second position range 36C is formed continuously from the reverse-position range 36B at the right side of the reverse-position range 36B on the paper of FIG. 5 with an interval between the opening upper and lower sides in the neutral/drive/second position range being made further greater than that of the reverse-position range 36B by an amount of one step. The opening upper side of the neutral/drive/second position range 36C is formed in the shape of a circular arc with the through hole 32A serving as a pivot point. When the detent pin 20 is located at the neutral/drive/second position range 36C, the detent pin 20 can freely move between the respective shift positions in the neutral/drive/second position range 36C. However, at this time, the detent pin 20 abuts against a wall between the reverse-position range 36B and the neutral/drive/second position range 36C so as to be prevented from moving from the neutral position to the reverse position. Further, a low-position range 36D is formed continuously from the neutral/drive/second position range 36C at the right side of the neutral/drive/second position range 36C on the paper of FIG. 5 with an interval between the opening upper and lower sides in the low-position range 36D being made smaller by an amount of one step. As a result, the detent pin 20 located in the neutral/drive/second position range 36C abuts against a wall between the second position and the low-position range 36D and the movement of the detent pin 20 from the second position to the low-position range 36D is thereby prevented. The opening upper side of the low-position range 36D is formed in the shape of a circular arc with the through hole 32A serving as a pivot point. When the detent pin 20 is located at the low-position range 36D, the detent pin 20 is adapted to be movable toward the side of the neutral/drive/second position range 36C. On the other hand, the detent pin 20 abuts against a wall at the right side of the lowposition range 36D on the paper of FIG. 5 (the wall being disposed opposite to the neutral/drive/second position range 36C), so as not to be moved toward the right side.

Meanwhile, the detent opening 36 can be formed in various shapes in accordance with the type of a shift operation. The detent pin 20 may be engaged with only the detent opening 36 formed in the wall portion 30B during the shift operation with the longitudinal dimension thereof being made shorter than the distance between the pair of wall portions 30A. In this case, the through opening portion of the detent opening 36 formed in the wall portion 30C functions as a guide groove for guiding the detent pin 20 to the detent opening 36 formed in the wall portion 30B at the time of assembling. As a result, even when an interval between the side wall portions 30B in the detent portion 30 with the lever-shaft-portion through hole 26 being interposed between the side wall portions is set to be shorter than the length of the retainer portion 18 (i.e.., an interval between the wall portions 30C), the shift lever 10 can easily be mounted in the base member 12.

Since the detent opening 36 is provided in each of the side wall portions in the detent portion 30 with the lever-shaft-portion through hole 26 being interposed between the side wall portions, as compared with the structure in which the detent opening 36 is formed only in one side wall portion, the strength of the device can be improved.

A hole 48 which allows a bolt 46 to pass through is formed in each of four corner portions of the base member 12 with an axial center thereof being disposed along a direction perpendicular to the base member 12, i.e., the vertical direction of the vehicle. The bolts 46 are used to fasten the base member 12 to an unillustrated fixed member provided at the vehicle side. A pair of fixing portions 50 are formed in the base member 12 for each of the bolts 46 so as to cover and fix a head portion of the bolt and are each formed to project in the shape of a hook in such a manner that respective free end portions thereof face each other with the head portion of the bolt being interposed between the free end portions. The head portion of the bolt 46 used herein is formed in the shape of a rectangular parallelepiped and the dimension of a shorter side thereof is made shorter than the interval between the free end portions of the pair of fixing portions 50. In a case in which the base member 12 is fastened by the bolts 46, after the head portion of each bolt 46 has passed through a space between the free end portions of the pair of fixing portions 50 with the longer sides of the head portion being disposed parallel to edge lines of the free end portions of the fixing portions 50, the head portion of the bolt 46 is rotated at an angle of 90 degrees and is accommodated between lower portions of the bent free end portions of the pair of fixing portions 50.

Meanwhile, the pivot-supporting housing portion 32 provided below the base member 12 is formed in the shape of a box with an upper side being opened and does not have any opening portion in the lower portion and in the bottom surface portion of the base member 12. For this reason, it is not necessary to separately provide, for these portions, covering members such as waterproof boot members or the like.

Next, an operation of mounting the shift lever 10 in the pivot-supporting housing portion 32 of the base member 12 to manufacture the shift lever device will be described.

First, the shift lever 10 is inserted into the retainer-portion insertion hole 24 of the base member 12 from the side of the retainer portion 18 diagonally along a slope 40B of an abutting side surface 40 (i.e., in the direction indicated by arrow IN). When the shaft pin 34 passes through and is fixed to the bearing hole 22 of the retainer portion 18 and the through hole 32A of the base member 12 with these holes being made coincident with each other, the shift lever 10 is, as shown in FIG. 1, pivotally supported by the pivot-supporting housing portion 32. Meanwhile, the shift lever 10 located at the position shown in FIG. 1 is set at a parking shift range position.

Subsequently, an unillustrated wire end portion passing through the V-shaped box portion 42 is wound around the wire-wound pin 21 through the transmission connecting wire through portion 28 and an unillustrated vehicle transmission is mounted, via the wire, in the shift lever device in an operational manner. Meanwhile, since the wire through hole 44 is closed by an end portion of a wire tube being mounted thereto from an exterior of the V-shaped box portion 42, there is no possibility that water or the like penetrates into the V-shaped box portion 42 via the wire through hole 44.

Next, a method of using the shift lever device and an operation thereof will be described.

First, in this shift lever device, when the shift lever 10 is located at the position indicated in FIG. 1, the abutting side surface portion 19 of the shift lever 10 abuts against the abutting side portion 40 and the detent pin 20 abuts against a side surface 30C of a bent portion of the detent portion 30. Accordingly, the shift lever 10 is located at the parking shift range position in a state of not being capable of swinging around the shaft pin 34.

Next, when the shift lever 10 is moved to other shift range position (for example, any of shift ranges of reverse "R", neutral "N", drive "D", second "2", low "L", and the like), an operating button mounted at an unillustrated free end portion of the shift lever 10 is pressed and the detent pin 20 is pushed down in the downward direction on the paper of FIG. 1 to the position of the detent opening 36. In this state, the shift operation is effected in such a manner that the shift lever 10 swings toward the right on the paper of FIG. 1 with the shaft pin 34 serving as a pivot point. As a result, the detent pin 20 enters the detent opening 36 and the shift lever 10 is thereby moved to a desired shift range position. Subsequently, pressing of the operating button is released, the detent pin 20 is moved in the upward direction on the paper of FIG. 1, and as shown in FIG. 2, the detent pin 20 is engaged with the concave and convex portion of the detent opening 36 which allows predetermined restriction of movement of the detent pin 20. When the movement of the detent pin 20 is restricted by the detent opening 36, a shift changing operation is effected in such a manner that the state in which the movement of the detent pin 20 is restricted is released by pressing the operating button.

Namely, when the detent opening 36 having the shape shown in FIG. 5 is provided, first, when the shift lever 10 is located at the parking position, the shift operation of the shift lever 10 is effected with the operating button being pressed and the detent pin 20 being pushed down, the detent pin 20 is inserted in the reverse-position range 36B via the through opening portion 36A, and the shift lever 10 is located at the reverse position. In the case in which the shift lever 10 is shifted from the reverse position to each position of neutral, drive and second shift positions, it suffices that the shift lever 10 is moved to a desired shift position in the above-described state. Further, when the shift lever 10 is shifted from the second position to the low position, the operating button is pressed, the detent pin 20 is pushed down, and the detent pin 20 is inserted in the low-position range 36D.

Next, when the shift lever 10 is shifted from the low position to each position of neutral, drive, second shift positions, it suffices that the shift lever 10 is moved to a desired shift position in the above-described state. In addition, when the shift lever 10 is shifted from the neutral position to the reverse position, the shift operation is effected in such a manner that the operating button of the shift lever 10 is pressed and the detent pin 20 is pushed down, and the detent pin 20 is inserted in the reverseposition range 36B. Further, when the shift lever 10 is shifted from the reverse-position range 36B to the parking position, the shift operation is effected with the operating button being pressed and the detent pin 20 being pushed down, and the detent pin 20 is moved to the parking position through the through opening portion 36A.

Meanwhile, in the above-described embodiment, the transmission connecting wire through portion 28, the retainer-portion insertion hole 24, and the lever-shaft-portion through hole 26 are formed at the intermediate portion of the base member 12 to extend in the vertical direction of the vehicle and do not have a portion which is made smaller in the transverse direction and a bent portion in each region from the upper end to the lower end. For this reason, when the base member 12 is formed integrally, the transmission connecting wire through portion 28, the retainer-portion insertion hole 24 and the lever-shaft-portion through hole 26 can be formed by drawing, in the upward direction, a forming die for forming the transmission connecting wire through portion 28, the retainer-portion insertion hole 24 and the lever-shaft-portion through hole 26, and therefore, a complicated split-mold structure is not required any longer. Further, although it suffices that the wire through hole 44, through hole 32A, detent opening 36, holes 48 and the like may be formed by mechanical processing after the above molding, these portions may be formed at the time of integral molding of the base member 12.

While the embodiment of the present invention, as herein disclosed, constitutes a preferred form, it is to be understood that other forms might be adopted.

What is claimed is:

1. A shift lever device comprising:
   a base member in which a shift lever is mounted, the shift lever being provided with a pivot-supporting retainer portion disposed at a base portion of a lever shaft portion and a detent pin projecting from an intermediate portion of the lever shaft portion and operated to be movable in an axial direction on the lever shaft portion, said base member including a retainer-portion insertion hole having an opening area which is greater than or equal to an area which allows the retainer portion of the shift lever to pass through,
   a lever-shaft-portion through hole which communicates with the retainer-portion insertion hole of said base member and which is formed to have an opening area which allows a predetermined shift operation of the lever shaft portion;
   a pivot-supporting housing portion from one surface portion of said base member in the shape of a box with said retainer-portion insertion hole and said lever-shaft-portion through hole being formed, said pivot-supporting housing portion being provided to allow mounting of the shift lever in a swingable manner at a predetermined angle by the retainer portion being pivotally supported at a bottom portion of said pivot-supporting housing portion;
   a detent portion provided upright in the shape of a wall along side portions of said retainer-portion insertion hole and said lever-shaft-portion through hole on a surface portion of said base member which is opposite to the surface portion where said pivot-supporting housing portion is formed; and
   a detent opening formed in said detent portion at a position corresponding to a moving range of the detent pin.

2. A shift lever device according to claim 1, wherein the pivot-supporting retainer portion and the detent pin are provided to face in a transverse direction of a vehicle with axial lines thereof being disposed in a direction perpendicular to an axial line of the lever shaft portion and each length of the pivot-supporting retainer portion and the detent pin in the transverse direction of the vehicle is made longer than the length of said lever-shaft-portion through hole in the transverse direction of the vehicle.

3. A shift lever device according to claim 2, wherein said detent opening is provided in at least a portion of said detent portion formed in the shape of a wall along side portions of said lever-shaft-portion through hole and a portion of said detent portion formed in the shape of a wall along side portions of a connecting portion of said retainer-portion insertion hole and said lever-shaft-portion through hole.

4. A shift lever device according to claim 3, wherein said detent opening is formed on both sides of said detent portion which face each other in the transverse direction of the vehicle, with said lever-shaft-portion through hole being interposed between the sides of said detent portion.

5. A shift lever device according to claim 3, wherein said detent opening is formed in such a manner that its opening bottom side is made in a straight line manner and its opening upper side is formed in a stepped manner, and includes, at the side of the retainer-portion insertion hole, an opening portion between opening upper and lower sides to cause the detent pin to be inserted into said lever-shaft-portion through hole.

6. A shift lever device according to claim 1, wherein said detent portion is formed such that a portion of said detent portion formed in the shape of a wall along side portions of a connecting portion of the retainer-portion insertion hole and said lever-shaft-portion through hole is made highest and a height-wise dimension of said detent portion are gradually made lower in forward and rearward directions of a vehicle.

7. A shift lever device according to claim 2, wherein the pivot-supporting retainer portion is formed in the shape of a tube having a bearing hole.

8. A shift lever device according to claim 7, wherein a through hole is formed on side surfaces of a lower portion of said pivot-supporting housing portion, the side surfaces facing in the transverse direction of the vehicle, and the lever shaft portion is pivotally supported by said pivot-supporting housing portion with a shaft pin passing through the through hole of the pivot-supporting housing portion and the bearing hole of the pivot-supporting retainer portion.

9. A shift lever device according to claim 8, wherein a space between the shaft pin and the through hole is sealed so that water or the like does not penetrate into an inner portion of said pivot-supporting housing portion from the vehicle-lower side of said housing portion.

10. A shift lever device comprising:
    a shift lever including a lever shaft portion, a pivot-supporting retainer portion projecting from a base portion of the lever shaft portion in a transverse direction of a vehicle, and a detent pin projecting from an intermediate portion of the lever shaft portion in the transverse direction of the vehicle and operated to be movable in an axial direction of the lever shaft portion;
    a base member in which said shift lever is mounted in a swingable manner at a predetermined angle;
    a pivot-supporting housing portion provided to project from one surface portion of said base member in the shape of a box and pivotally supporting the retainer portion at a bottom portion of said pivot-supporting housing portion;

a retainer-portion insertion hole formed in said base member and in said pivot-supporting housing portion and provided to have an opening area which allows the retainer portion to pass through;

a lever-shaft-portion through hole which communicates with said retainer-portion insertion hole and which is formed in said base member and in said pivot-supporting housing portion, said lever-shaft-portion through hole having an opening area which allows a predetermined shift operation of said lever shaft portion;

a detent portion provided upright in the shape of a wall along side portions of said retainer-portion insertion hole and said lever-shaft-portion through hole on a surface portion of said base member which is opposite to the surface portion where said pivot-supporting housing portion is formed; and a detent opening formed in said detent portion at a position corresponding to a moving range of the detent pin.

11. A shift lever device according to claim 10, wherein said detent opening is provided in at least a portion of said detent portion formed in the shape of a wall along side portions of said lever-shaft-portion through hole and a portion of said detent portion formed in the shape of a wall along side portions of a connecting portion of said retainer-portion insertion hole and said lever-shaft-portion through hole, and said detent opening is formed on both sides of said detent portion which face each other in the transverse direction of the vehicle, with said lever-shaft-portion through hole being interposed between the sides of said detent portion.

12. A shift lever device according to claim 10, wherein a position on said pivot-supporting housing portion at which the retainer portion of said shift lever is pivotally supported is sealed so that water or the like does not penetrate into an inner portion of said pivot-supporting housing portion from a vehicle-lower side of said housing portion.

13. A shift lever device comprising:

a shift lever including a lever shaft portion, a pivot-supporting retainer portion projecting from a base portion of the lever shaft portion in a transverse direction of a vehicle, and a detent pin projecting from an intermediate portion of the lever shaft portion in the transverse direction of the vehicle and operated to be movable in an axial direction of the lever shaft portion;

a base member in which said shift lever is mounted in a swingable manner at a predetermined angle;

a pivot-supporting housing portion provided to project from one surface portion of said base member in the shape of a box and pivotally supporting the retainer portion at a bottom portion of said pivot-supporting housing portion;

a retainer-portion insertion hole formed in said base member and in said pivot-supporting housing portion and provided to have an opening area which allows the retainer portion to pass through;

a lever-shaft-portion through hole which communicates with said retainer-portion insertion hole and which is formed in said base member and in said pivot-supporting housing portion, said lever-shaft-portion through hole having an opening area which allows a predetermined shift operation of said lever shaft portion;

a detent portion provided upright in the shape of a wall along side portions of said retainer-portion insertion hole and said lever-shaft-portion through hole on a surface portion of said base member which is opposite to the surface portion where said pivot-supporting housing portion is formed; and a detent opening formed in said detent portion at a position corresponding to a moving range of the detent pin, said detent opening being provided in at least a portion of said detent portion formed in the shape of a wall along side portions of said lever-shaft-portion through hole and a portion of said detent portion formed in the shape of a wall along side portions of a connecting portion of said retainer-portion insertion hole and said lever-shaft-portion through hole.

14. A shift lever device according to claim 13, wherein each length of the pivot-supporting retainer portion and the detent pin in a transverse direction of the vehicle is made longer than the length of said lever-shaft-portion through hole in the transverse direction of the vehicle.

15. A shift lever device according to claim 13, wherein said detent opening is formed on both sides of said detent portion which face each other in the transverse direction of the vehicle, with said lever-shaft-portion through hole being interposed between the sides of said detent portion.

16. A shift lever device according to claim 13, wherein said detent opening is formed in such a manner that its opening bottom side is made in a straight line manner and its opening upper side is formed in a stepped manner, and includes, at the side of the retainer-portion insertion hole, an opening portion between opening upper and lower sides to allow the detent pin to be inserted into said lever-shaft-portion through hole.

17. A shift lever device according to claim 13, wherein said detent portion is formed such that a portion of said detent portion formed in the shape of a wall along side portions of a connecting portion of the retainer-portion insertion hole and said lever-shaft-portion through hole is made highest and a height-wise dimension of said detent portion are gradually made lower in forward and rearward directions of the vehicle.

18. A shift lever device according to claim 13, wherein the pivot-supporting retainer portion is formed in the shape of a tube having a bearing hole.

19. A shift lever device according to claim 18, wherein said through hole is formed on side surfaces of a lower portion of said pivot-supporting housing portion, the side surfaces facing in the transverse direction of the vehicle, and the lever shaft portion is pivotally supported by said pivot-supporting housing portion with a shaft pin inserted within the through hole of the pivot-supporting housing portion and the bearing hole of the pivot-supporting retainer portion.

20. A shift lever device according to claim 19, wherein an interface between the shaft pin and the through hole is sealed so that water or the like does not penetrate into an inner portion of said pivot-supporting housing portion from a vehicle-lower side of said housing portion.

* * * * *